United States Patent [19]
Van der Burg

[11] 4,257,467
[45] Mar. 24, 1981

[54] RUN-FLAT TIRE

[75] Inventor: Sjirk Van der Burg, Embourg, Belgium

[73] Assignee: Uniroyal AG, Aachen, Fed. Rep. of Germany

[21] Appl. No.: 57,775

[22] Filed: Jul. 16, 1979

Related U.S. Application Data

[63] Continuation of Ser. No. 831,829, Sep. 9, 1977, Pat. No. 4,177,848.

[30] Foreign Application Priority Data

Nov. 25, 1976 [DE] Fed. Rep. of Germany ....... 2653658

[51] Int. Cl.³ .............................................. B60C 17/04
[52] U.S. Cl. ............................. 152/158; 152/330 RF; 152/340
[58] Field of Search ............... 152/156, 157, 158, 166, 152/330 RF, 192, 340, 352 A

[56] References Cited

U.S. PATENT DOCUMENTS

| | | | |
|---|---|---|---|
| 1,002,214 | 9/1911 | Bernier | 152/157 |
| 1,440,974 | 1/1923 | Dornburgh | 152/156 |
| 3,392,772 | 7/1968 | Powers | 152/158 |
| 4,008,743 | 2/1977 | Welch | 152/158 |
| 4,071,386 | 1/1978 | Gomberg | 152/330 RF |
| 4,137,894 | 2/1979 | Gardner et al. | 152/330 RF |
| 4,157,106 | 6/1979 | Cataldo | 152/330 RF |

FOREIGN PATENT DOCUMENTS

2724273  12/1978  Fed. Rep. of Germany .......... 152/152

*Primary Examiner*—Michael G. Wityshyn
*Attorney, Agent, or Firm*—Philip Rodman

[57] ABSTRACT

In a pneumatic, tired wheel having a tubeless tire mounted on the rim of the wheel, the improvement comprising a toroidal support device to enable the tired wheel to travel in a flat state. The support device comprises an inflatable, toroidal, inner tube located on the rim for elastically clamping the tire beads against the rim flanges, said tube radially extending from the well of the rim to or slightly beyond the radially outer edges of the rim flanges, and a toroidal support element whose radially internal, circumferential wall section is impervious to puncture and lies adjacent the radially external, circumferential area of the inner tube, and wherein the outer surface area of the support element is spaced from the inner surface area of the tire when the tire is in its inflated state so that under normal travel conditions the support element does not contact the inner surface area of the tire. The foregoing abstract is neither intended to define the invention disclosed in the specification, nor is it intended to limit the scope of the invention in any way.

5 Claims, 4 Drawing Figures

RUN-FLAT TIRE

This is a continuation of application Ser. No. 831,829, filed Sept. 9, 1977, now U.S. Pat. No. 4,177,848.

BACKGROUND OF THE INVENTION

The invention relates to vehicle pneumatic tires and more particularly to a vehicle pneumatic tire with properties for travel in the flat state, wherein a toroidal support device is arranged on the inside of a tubeless tire mounted on a rim.

Efforts have been under way for a long time to design a vehicle pneumatic tire which is puncture-proof and self-sealing in order to obtain a run-flat tire. For this purpose, it is known to fill out the pneumatic vehicle tire following manufacture with foam material (cf. German Disclosures Nos. 19 36 526, 15 05 029, 16 05 664). Upon occurrence of a puncture, the inner area in the tread zone comes to apply against the area in proximity of the beads of the tire. Thereby occurs a substantial fulling activity and, in the case of a vehicle continuing to travel under load, a marked friction between the inner areas of the tire, which phenomena results in rapid destruction of the tire. Moreover, there exists the risk that, as a result of the fulling under load, the tire beads may detach from their fixed seat on the rim so that the tire separates from the rim. In any event, in the case of a flat tire, ability to properly steer the vehicle is lost.

Complete filling of the tire with foamed material results in a tire offering a substantially poorer travel comfort. Therefore, tires foam-filled in this manner are suitable only for vehicles intended for special applications, such as vehicles designed for emergency use in natural catastrophes, for bulletproof tires, or the like. To this factor one must add that the pressure brought about by the filling with foam material is reduced with time as a result of diffusion or other factors.

In order to prevent the separating of the beads from their fixed seat on the rim, it is furthermore known in the art to arrange a toroidal support device at the bottom of the rim which fills the remaining free space within the cross-section of the rim and the beads supported thereupon and clamps the beads rigidly or elastically against their seat areas on the rim. As a result, detachment of the beads from the rim during travel in the flat condition is prevented. Moreover, the toroidal support device whose radially external circumferential area is situated substantially at the level of the radially outer edges of the rim flanges or extends only slightly therebeyond offers an additional support area for the central zone of the tread section of the tire upon travel in the flat state (cf. German Disclosure No. 23 39 516) or U.S. Pat. No. 4,059,138.

In the case of another support device for run-flat tires, the toroidal support body projects cross-sectionally substantially beyond the maximum diameter of the rim flanges radially outwardly and far into the interior of the inflated tire. The radially internal foot section of the support body situated in the rim area has a reinforced section situated at the level of the tire beads forcing the beads against the seat areas in the rim. The section of the support body projecting therebeyond and connected therewith as a one-piece element is designed in the shape of a torus and has a substantially circular cross-section whereby, upon the use of the pneumatic tire, there remains between the inner surface of the inflated tire and the outer surface of the toroidal support body a sickle-shaped clearance which, with its cross-sectional edges, extends down into the bead area. Owing to this design, the friction between the support body and the tire is substantially reduced in normal operation. The toroidal support body consists of a rubbery material having closed and pressurized gas or air cells. On the inside of the toroidal support body there can also be provided an air chamber inflatable by means of a separate valve from the outside. In any event, the air chambers and cells of the support body are sealed with respect to the cross-sectionally annular space between the support body and the tire. As a result of the inflation pressure of the tire, the cross-section of the support body comes to be compressed whereas, upon the flattening of the tire, the support body comes to expand cross-sectionally as a result of the internal pressure in the cells or air chambers (cf. French Pat. No. 1,390,440).

SUMMARY OF THE INVENTION

Based on the run-flat tires of the last-mentioned type, it is the object of the instant invention to improve such a tire so that, even under extreme conditions, said tire will still exhibit satisfactory travel properties in the flat state, without an excessive increase in the weight of the tire for normal operation and without any imbalance or vibration. At the same time, there is also provided simplicity of mounting, even on a single-piece rim and prevention of any damage to the pressurized portion of the support device as a result of foreign elements causing flattening of the tire. Finally, any friction between the tire and the support device during normal operation is avoided.

The aforementioned objects are achieved in accordance with the instant invention which provides an improvement in a pneumatic, tired wheel having a tubeless tire mounted on the rim of the wheel, the improvement comprising a toroidal support device to enable the tired wheel to travel in a flat state. The support device comprises an inflatable, toroidal, inner tube located in the rim for elastically clamping the tire beads against the rim flanges, said tube radially extending from the well of the rim to or slightly beyond the radially outer edges of the rim flanges, and a toroidal support element whose radially internal circumferential wall section is impervious to puncture and lies adjacent the radially external, circumferential area of the inner tube, and wherein the outer surface area of the support element is spaced from the inner surface area of the tire when the tire is in its inflated state so that under normal travel conditions the support element does not contact the inner surface area of the tire.

DESCRIPTION OF THE PREFERRED EMBODIMENTS

Figure 1:
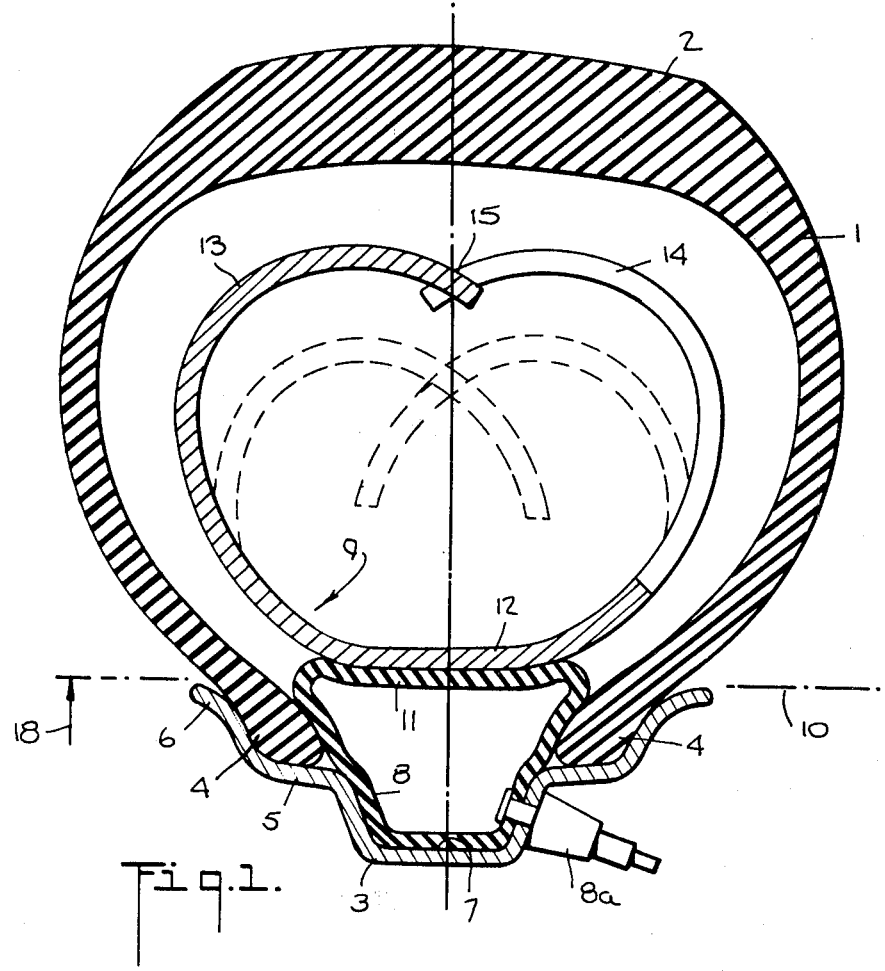
FIG. 1 is a sectional view of a vehicle pneumatic tire in operating condition on a one-piece rim, with a toroidal support device in accordance with the invention.
Figure 2:
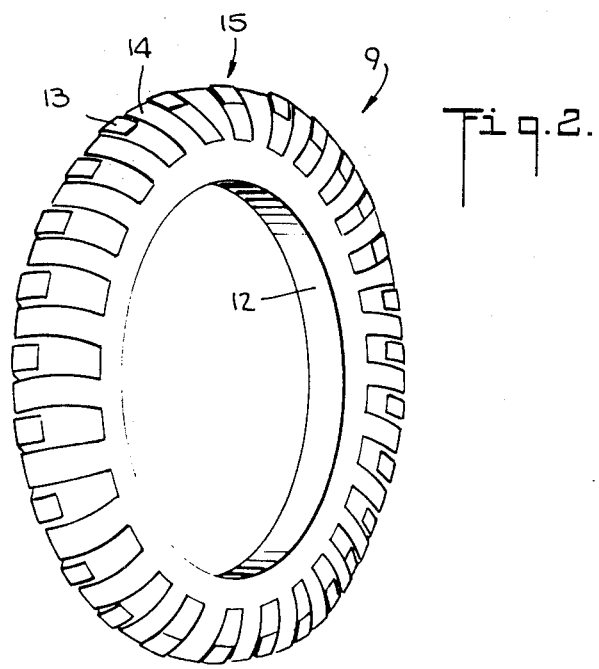
FIG. 2 is a perspective view of the outer support element of the support device shown in FIG. 1.

One embodiment of the inventive support device is shown in FIGS. 1 and 2, wherein there is seen a tire 1 having a tread 2 fixedly mounted with its bead areas 4 on the corresponding seat areas of a wheel rim 3. The rim 3 has shoulders 5 and flanges 6 that constitute an angle-shaped seating area for the beads.

In the well 7 of the rim 3 there is inserted the first portion of the support device, to wit, an inner tube 8 constituting an inherently closed air chamber externally inflatable via a separate valve 8a. The inner tube 8 can be made from relatively thin rubber material which, if necessary, can be reinforced by a fabric ply or the like. In its inflated state, the inner tube 8 may have a circular, oval, or even a profiled cross section.

The inner tube 8 is designed to fill out the well 7 of the rim 3 and, in its operating state, illustrated in FIG. 1, to press against the inside of the bead areas 4 and, in this way, force the beads against their seating areas on the rim 3.

The second portion of the support device is a toroidal support element 9 having a torus-like cross section similar to that of the tire 1 itself, but being of a reduced cross-sectional area so that there remains between the support element 9 and the inside of the tire 1 a sickle-shaped space when the tire pressure is normal. The support device shown in FIG. 1 is preferably made in such a way that the support element 9 will not contact the inner area of the tire 1 at any point during normal operation so that no friction can occur between these two bodies.

The support element 9 has a radially internal, circumferential wall section 12, defining in the mounted, operating condition, the contact plane 10 between the inner tube 11 and the support element 9. The diameter 18 of the contact or support plane 10 is at least equal to and preferably somewhat larger than the maximum diameter of the flanges 6 of the rim 3.

The wall section 12 is circumferentially inextensible and consists of a material that cannot be punctured. For this purpose the entire toroidal support element 9 preferably consists of one piece of sheet metal, or a correspondingly rigid plastic material, or a hard rubber compound.

As seen in FIG. 2, the two sidewall sections of the support element 9 emanating from the wall section 12 are designed in the form of a comb and comprise reciprocal, circumferentially spaced, strip-like prongs 13 and 14 which are bent to define the contour of the support element 9 and mate with one another in the area 15 so that they circumferentially mutually support one another and permit bending into one another substantially in the position shown by the dotted lines in FIG. 1 when the support element 9 is subjected to loads which occur when the tire 1 loses its internal pressure and rests with its inner surface on the support element 9 in the area of the tread 2. The sidewall sections have adequate elasticity and rigidity properties in order to reliably and elastically absorb, upon travel of the tire in the flat state, the load to be borne by the tire.

Upon flattening of the vehicle pneumatic tire 1, the wall section 12 completely covers the radially external circumferential area of the inner tube 8 and protects same against any attack from the outside by mechanical means as well as against any fulling during travel in the flat state. As a result, it is possible to travel extensive distances with a flat tire.

Figure 3:
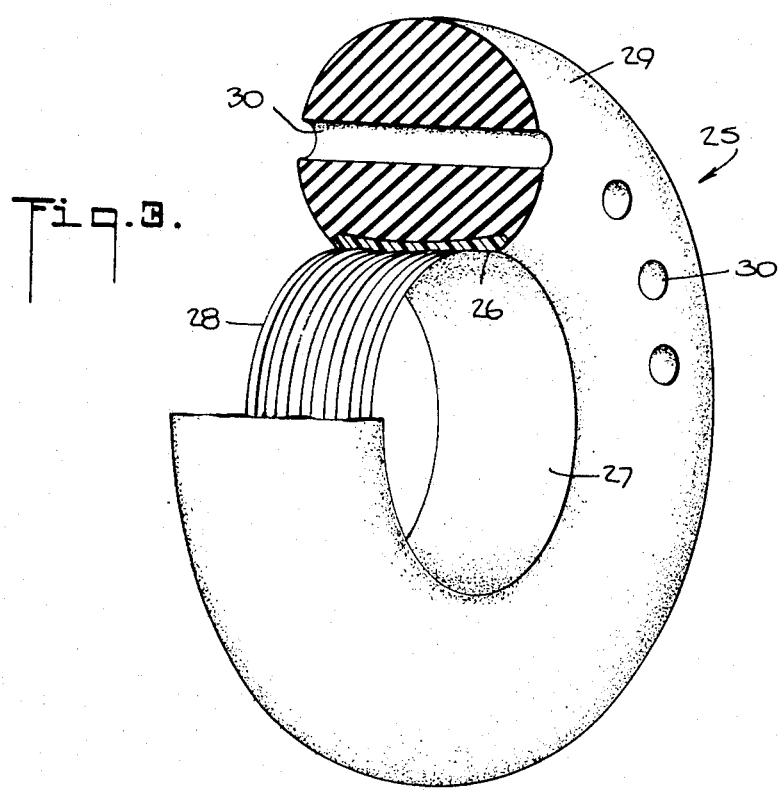
FIG. 3 is a perspective view, partially cross-sectioned, of a modified support element for a support device in accordance with the invention.
Figure 4:
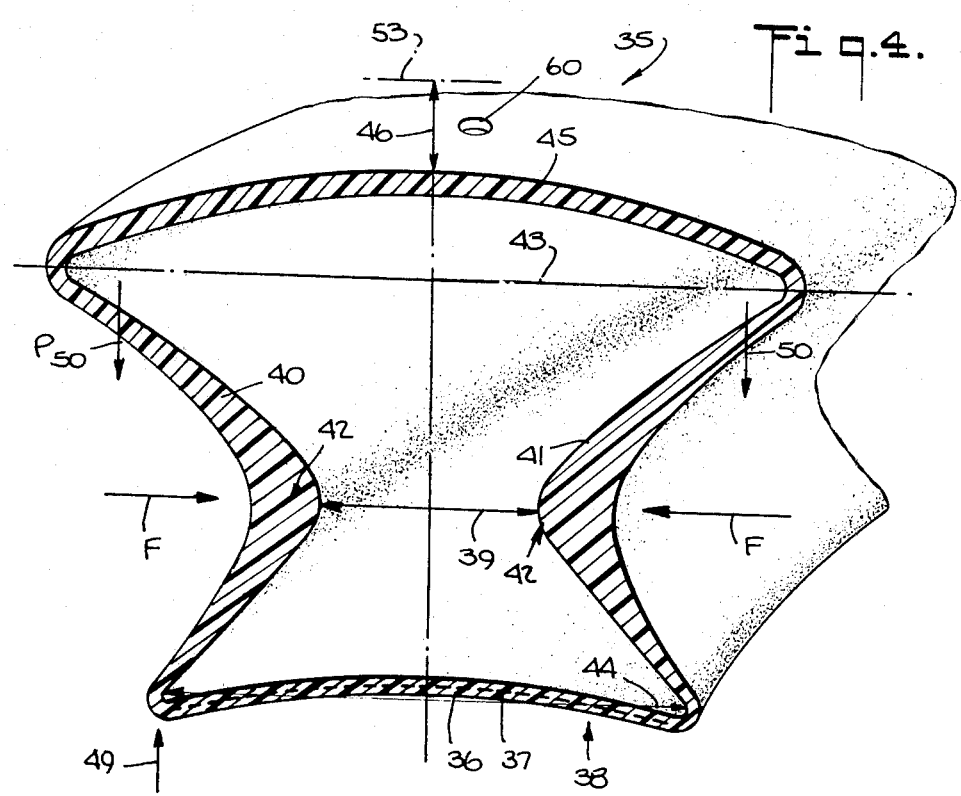
FIG. 4 is a partially sectioned, perspective view of a modified support element having a profile that can be manufactured by extrusion.

FIGS. 3 and 4 illustrate two additional embodiments of the support device in which the design and arrangement of the inner tube 8 as well as its function remain unchanged. The embodiments of FIGS. 3 and 4 differ from that of FIG. 2 only by a different design of the outer toroidal support element of the support device.

In the case of the embodiment of FIG. 3, the support element 25 is made up of a radially internal belt 26 reinforced by ropes, wires, filaments, or cords 28 and a torus-like body 29 of circular cross section joined thereto in a single piece and preferably made from foam material with opened or closed cells, solid rubber, or a plastic material. The radially internal, tape-like, nonextensible and punctureproof belt 26 defines with its inner circumferential area 27 the diameter 18 of the contact plane 10 according to FIG. 1. The diameter of the central opening enclosed by the area 27 is at least equal to the maximum diameter of the rim flange 6.

The resilience of the toroidal body 29 can be increased by recesses or bore 30 running substantially parallel to the axis of the body 29. The resilience and rigidity of the toroidal body 29 determine the load-carrying capacity of the support element 25 in FIG. 3. As a result of the inflated tube 8, the support element 25 is firmly tensioned over the rim 3 and is therefore capable of transfering the necessary lateral and steering forces.

The toroidal support element 35 illustrated in FIG. 4 is one which may be manufactured in an especially simple and inexpensive manner. The support element 35 is an inherently closed, endless, toroidal body that, prefabricated in this form, can be pushed onto the rim 3 according to the assembly instructions described below in greater detail, following mounting of the inner tube 8 on the rim and moderately inflating same.

The toroidal support element 35 has a radially internal, axially extending wall 36 which, cross-sectionally may be slightly curved to the outside. The lower side 38 of this wall 36 defines the contact plane 10 between the support element 35 and the inner tube 8. The minimum inside diameter 49 of the support element 35 is therefore at least equal to the maximum diameter 18 of the rim flanges 6. For the purpose of stiffening the inner wall 36, same can be reinforced with an insert 37, which preferably is nonextensible and protects the wall 36 against puncture. The axial width of the wall 36, suggested by the twin arrow 44, is such that the edges of the support element 35, during normal operation of the pneumatic tire 1, have virtually no contact with the inner area of the tire 1, but, upon a drop in pressure inside the tire 1, the axial width 44 is adequate to protect the radially internally situated inner tube 8 against puncture or other effects by mechanical forces upon travel in the flat state.

Extending from the lateral edges of the wall 36 are two sidewall sections 40 and 41 which, cross-sectionally, have an angular profile and are convex with respect to one another. The points 42 of maximum closeness of the sidewall sections 40 and 41, suggested by the arrow 39, are radially spaced from the wall 36. In the area of maximum closeness at points 42, the sidewall sections 40 and 41 exhibit a substantial wall thickness that is considerably greater than and preferably a multiple of the thickness of the wall 36. Beginning with the points 42 of maximum closeness, the thickness of the sidewall sections 40 and 41 decreases, preferably steadily, radially outwardly and radially inwardly substantially down to the thickness of the wall 36. The reciprocal spacing of the two sidewall sections 40 and 41 at their radially outwardmost ends is, as indicated by the plane 43, substantially greater than in the area of the wall 36. Said outwardmost ends are connected by a radially external, axially extending wall 45 substantially parallel to the radially internal, axially extending wall 36 and of about the same thickness as the wall 36, thereby producing, in cross-section, a closed toroidal support element 35 made from one material. This support element 35 is dimensioned such that the sidewall sections 40 and 41 are capable of yielding elastically in the direction of the arrows 50 and the arrows F and possess sufficient rigidity to absorb the load during travel of the tire 1 in the flat state.

The distance 46 from the support element 35 to the inner area 53 of the tire 1 in its crown, under standard operating conditions, preferably is at least 15 to 40 mm in order to assure that there will be no contact between the tire 1 and support element 35 in the event that the tire pressure drops slightly below standard pressure. This spacing distance applies to any of the support elements which may be used.

As far as operation is concerned, an internal overpressure of the support element 35 is not essential. Apertures 60 may be employed in the support element 35, said apertures 60 preferably being located in the radially external wall 45, in order to assure equal pressure within and without the support element 35.

The support element 35 consists preferably of a rectilinear, extruded, profiled element that, following cutting to its length, is developed, to form with its extremities, one single piece of an inherently closed toroidal element.

The novel supporting device disclosed herein can be readily and reliably mounted, even onto a one-piece rim. For this purpose, all that is necessary is first to push one bead of the vehicle pneumatic tire in the customary manner on the rim, whereupon one inserts the inner tube of the support device that is thereupon moderately inflated. In spite of its essentially nonextensible, radial inner segment, the outer support element can then be pushed onto the moderately inflated tube. Then, the second bead of the vehicle pneumatic tire is mounted onto the rim. The tire and inner tube of the support device are then inflated independently.

The inflated inner tube of the support device assures that the tire beads seat firmly against the rim and endows the support device with adequate elasticity for travel in case of a flat tire. The inner tube of the support device is, upon use, limited essentially to the unoccupied cross-sectional area of the rim and does not, even upon flattening of the tire, extend significantly beyond this cross-sectional area in view of the fact that the inner tube is virtually enclosed by the rim, the bead areas, and the circumferentially nonextensible inner area of the support element. The radially internal, circumferential wall section of the support element, upon travel with a flat tire, protectively covers the outer circumference of the inner tube and secures same against any damage by foreign elements, such as nails or the like that may have punctured the pneumatic tire and caused its flattening. As a result, the inner tube of the support device will perform its function even during extensive travel in the flat state.

Under normal conditions, the support element does not contact the inner area of the vehicle pneumatic tire so that no friction can occur between the two parts. The centering of the support element within the tire is brought about through the firm application of the radially internal, circumferential wall section of the support element against the outer circumferential area of the inner tube. In view of the fact that both the inner tube and the support element can be designed respectively as hollow bodies, the entire support device has a relatively light weight.

Various modifications and changes are contemplated and may obviously be resorted to, without departing from the spirit or scope of the invention as hereinafter defined by the appended claims.

What is claimed is:

1. In a pneumatic, tired wheel having a tubeless inflatable tire mounted on the rim of the wheel and having an inner tire surface, the improvement comprising a toroidal support device to enable the tired wheel to travel in a flat state, said support device comprising:

an inflatable, toroidal inner tube located in a well of the rim and having sidewall portions directly engageable with the tire beads to elastically clamp the tire beads against the rim flanges, said tube radially extending outwardly from the well of the rim to or slightly beyond the radially outer edges of the rim flanges, the radially outward portion of said tube having a radially external outer circumferential area, said tube being inflatable independently of the tire; and a separate noninflatable toroidal support element having a discrete cross-sectional shape within and without said tire, and sidewall portions that are discontinuous with corresponding sidewall portions of said inner tube, said support element being mounted on the radially extending outer circumferential area of said inner tube and being normally free from contact with said tire beads when the tire is in an inflated state, said support element having a radially internal circumferential wall section impervious to puncture, lying adjacent the radially external circumferential area of the inner tube and having an outer surface area spaced from the inner surface area of the tire when the tire is in its inflated state so that under normal travel conditions the support element does not contact the inner surface area of the tire.

2. The improvement of claim 1, wherein the radially internal, circumferential wall section of the toroidal support element consists of a material or is reinforced with a material that is not extensible in the circumferential direction.

3. The improvement of claim 2, wherein the radially internal, circumferential wall section has sufficient axial width such that, upon a pressure drop in the tire, said wall section can completely cover and protect the radially external circumferential area of the inner tube.

4. The improvement of claim 3, wherein the distance from the support element to the inner area of the tire crown under normal tire inflation conditions is at least 15 to 40 mm.

5. The improvement of claim 3, wherein the inner tube includes a profile which centers the support element on the inner tube through firm application of the radially internal circumferential wall section of the toroidal support element on the radially external circumferential area of the inner tube when said inner tube is inflated.

* * * * *